July 31, 1956  J. F. JOY  2,756,871
EXTENSIBLE FLEXIBLE SHAKER CONVEYOR
Filed Feb. 7, 1952  3 Sheets-Sheet 1
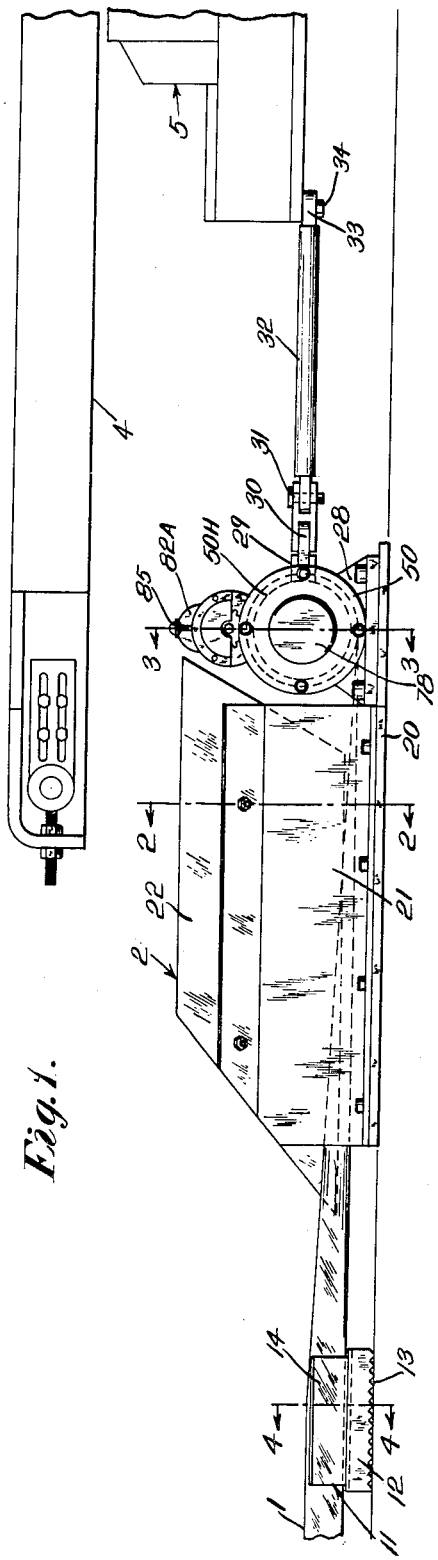
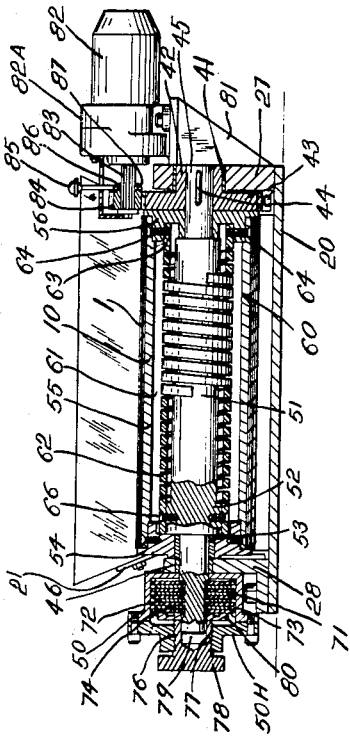
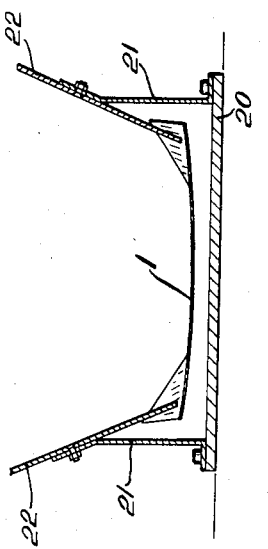
Inventor:
Joseph F. Joy.
by
Louis A. Maxon.
Attorney.

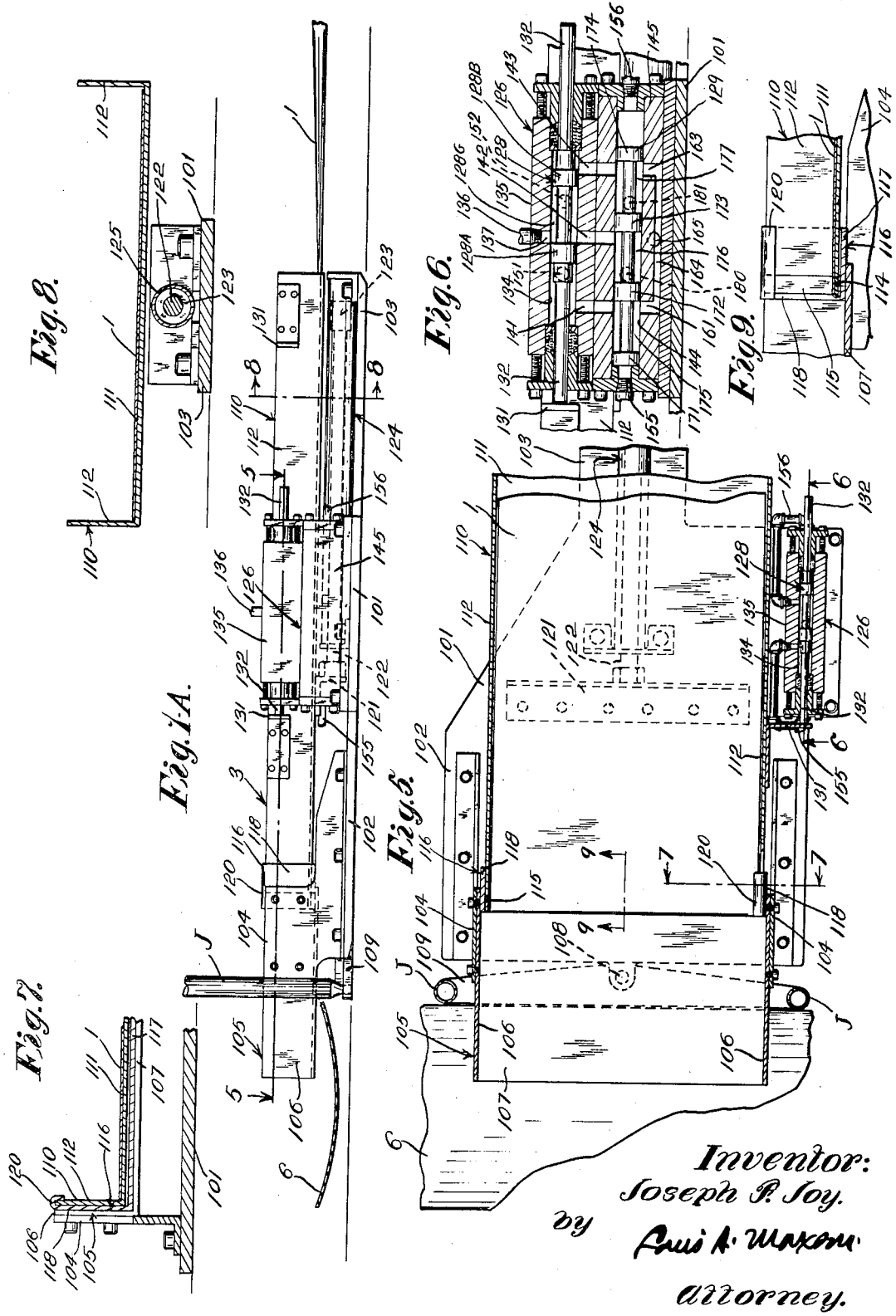

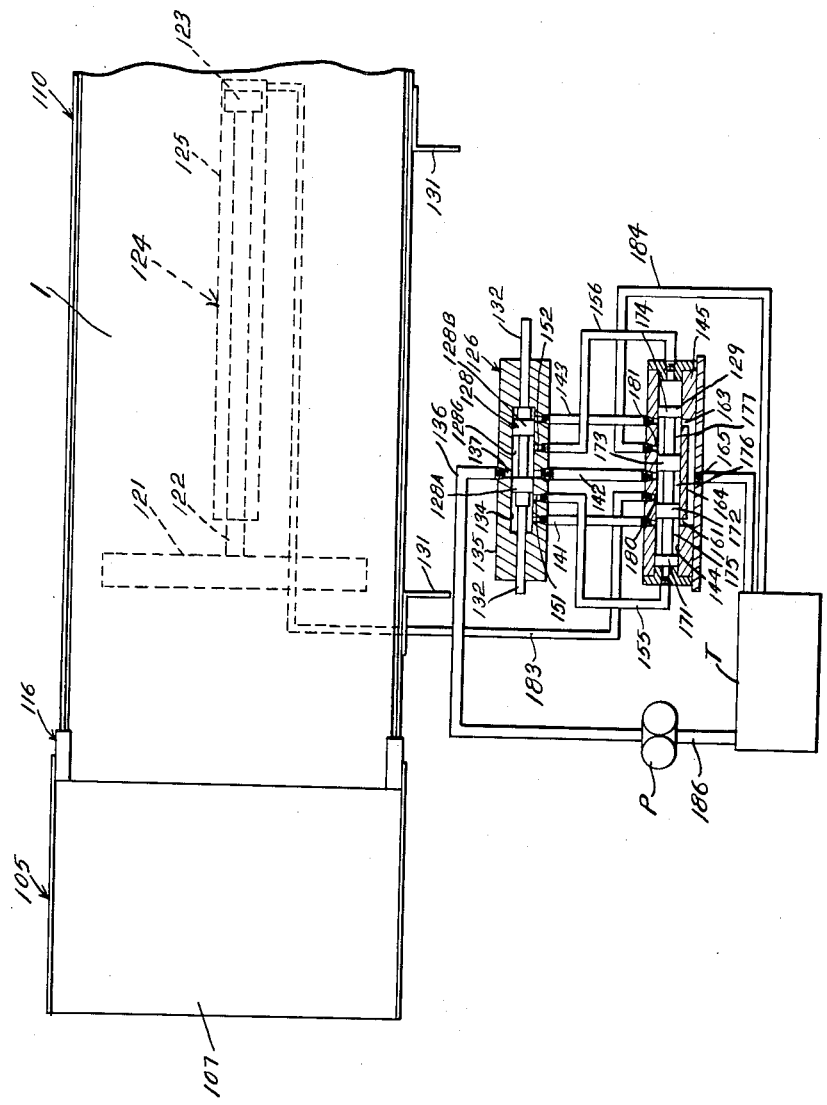

United States Patent Office 2,756,871
Patented July 31, 1956

2,756,871

EXTENSIBLE FLEXIBLE SHAKER CONVEYOR

Joseph F. Joy, Pittsburgh, Pa., assignor to Joy Manufacturing Company, Pittsburgh, Pa., a corporation of Pennsylvania Application February 7, 1952, Serial No. 270,334

17 Claims. (Cl. 198—220)

This invention relates to conveyors, and more particularly to that class of conveyors known as shaker conveyors. More specifically it relates to shaker conveyors in which a flexible steel strip is utilized to support the material in transit from a point of reception to a point of discharge and in which the alternate opposite longitudinal movements of the strip are so effected that the material moves with the strip as the latter makes its periodic movements in the discharge direction, whereas during the intermediate movements of the strip in the other direction—towards the point of material reception—there is a sliding of the surface of the strip beneath its load, so that the latter is caused to move over the strip in a series of intermittent advances.

There are now in use mining devices known as Continuous Miners. These attack mineral veins and relatively continuously disintegrate the material thereof and deliver the detached and disintegrated material to a point of discharge. These miners have relatively large capacity, and they are capable of extending an entry or the like many feet in the course of a shift. They therefore need, to handle the disintegrated mineral, material handling devices capable of transporting relatively large amounts of material, and of continuous operation, and requiring no shut-downs for increases in their working length; and desirably the attendant material handling devices should be automatically extensible in working length so that advances of the miner may be followed up without any need for the manual addition of extra conveyor sections or indeed any manual adjustments whatever accompanying a preliminary to each elongation. These conditions are satisfied by the present invention.

It is an object of the invention to provide an improved flexible shaker conveyor. It is another object to provide an improved flexible shaker conveyor which is extensible in length by mere traction thereon, without disturbing its readiness to operate or its operation. It is a further object of the invention to provide an improved expansible chamber type operating and controlling means for providing the discharge movements of a flexible shaker conveyor. It is a still further object to provide an improved means for resiliently venting the discharge movements and effecting the return movements of a flexible conveyor strip. It is another object to provide an improved drum mechanism for use with flexible conveyor strips. Other objects and advantages of the invention will hereinafter appear.

It will of course be understood that the invention is not limited to use with Continuous Miners.

In the accompanying drawings, in which one form of the invention in its various aspects is shown for purposes of illustration, Fig. 1 is a side elevation of the material receiving end of the illustrative apparatus, shown in conjunction with the delivery conveyor of a Continuous Miner.

Fig. 1A is a side elevation of the discharge end of the illustrative apparatus.

Fig. 2 is a vertical transverse section on the plane of the line 2—2 of Fig. 1, showing a view through the receiving hopper of the receiving end of the apparatus.

Fig. 3 is a vertical transverse section on the plane of the line 3—3 of Fig. 1 through the drum arrangement which forms a part of the material-receiving end of the apparatus.

Fig. 4 is a vertical transverse section on the plane of the line 4—4 of Fig. 1, showing a cross section through the flexible conveyor trough and a guiding and supporting means for the same.

Fig. 5 is a horizontal longitudinal sectional view on the plane of the line 5—5 of Fig. 1A showing details of the discharge end of the apparatus.

Fig. 6 is an enlarged vertical section on the plane of the line 6—6 of Fig. 5 through a distributing and control valve mechanism.

Fig. 7 is a fragmentary transverse section, on an enlarged scale, taken on the plane of the line 7—7 of Fig. 5 and showing details of the supporting and guiding arrangements at the discharge end of the apparatus.

Fig. 8 is a transverse vertical section on the plane of the line 8—8 of Fig. 1A, showing details of the discharge end of the apparatus, and on an enlarged scale.

Fig. 9 is a fragmentary longitudinal sectional view on the plane of the line 9—9 of Fig. 5, showing a desirable mode of attaching a flexible conveyor strip to the discharge apparatus.

Fig. 10 is a diagrammatic view showing the hydraulic system of the discharge apparatus.

Referring now to the drawings, it will be observed that, subject to the understanding that a substantial length of a flexible conveyor trough or element 1 is omitted between a material-receiving apparatus 2 and a material-discharge apparatus 3, there is disclosed in Figs. 1 and 1A, taken together, a side elevational view of an illustrative embodiment of a material-conveying apparatus constructed in accordance with the invention, and herein illustrated as receiving material from a discharge conveyor 4 of a Continuous Miner 5 and delivering it to a belt conveyor 6 in a mine passageway which extends transversely to the direction in which the miner is advancing the working face. The flexible conveyor trough or strip is desirably made of steel strip, is desirably 3 feet or more wide, measured along its surface, .030" or other suitable thickness, is incapable of sustaining longitudinal compressive forces of substantial magnitude without buckling, and can be wound flat upon a reel or drum, as for example the drum 10 which is associated with the material-receiving apparatus 2 and which is later described. The flexible conveyor trough 1 is desirably supported, between the material-receiving apparatus 2 and the material-discharge apparatus 3, at suitable intervals as by guides 11, including mine floor supported side bars 12, with serrated bottoms 13 to reduce their slippage and with troughed upper portions 14 conforming to and supporting the flexible conveyor trough 1.

Referring now to Figs. 1 to 3, it will be noted that the material-receiving apparatus 2 includes a base plate 20 with, commencing at the "discharge" end of which and extending nearly to the other end of which, upright lateral support plates 21 at each side thereof, and, herein generally trapezoidal, material guide plates 22, converging downwardly are supported on the support plates 21, with their lower edges lying close to and inside the edges of the flexible conveyor trough 1, and their upper edges underlying the discharge end of the discharge conveyor 4 but more widely spaced than the width of the latter so that material discharged by said discharge conveyor 4 will be assured of delivery to the conveyor trough 1.

At its end nearer the miner the base plate 20 has fixed to its upper surface upstanding pedestals 27 and 28 adjacent its opposite sides. To these pedestals there is suitably connected a transverse bar element 29 having a projecting central arm 30 pivotally connected as at 31 to a link or draw bar 32 whose opposite end 33 is pivotally connected at 34 to the miner 5. Accordingly it will be evident that as the miner advances, the material-receiving apparatus will be caused to follow it. It will be apparent with respect to many features of the invention that mounting of the base plate might be on a mobile support so that it would be advanced independently of traction by the miner.

The pedestal 27 carries a bearing 41 which rotatably supports the hub 42 of a gear 43 which is keyed at 44 to one end of a shaft 45 of which the other end is rotatably supported in a bearing 46 carried by the other pedestal 28. Outside the pedestal 28 the shaft 45 extends into and through a clutch housing 50 which is secured to the pedestal 28.

The shaft 45 has along its central portion an enlarged cylindrical portion 51, at whose end nearer the bearing 46 there is a further enlargement 52. Between the further enlarged portion 52 and the bearing 46 there is a bearing bushing 53 mounted in a head 54 of a cylindrical member 55 which surrounds the enlarged portions 51 and 52 and is fixed at its other end to a head 56 which is journaled on the shaft 45 between the gear 43 and the shaft enlargement 51. It will be noted that the cylindrical member 55 and the heads 54 and 56 are suitably held together and form a drum or reel unit 60 having an annular chamber 61 within it which houses a helical spring 62 one end 63 of which is fixed at 64, 64 to the head 56, and so to the drum or reel unit 60, while its other end is secured as at 66 to the larger enlargement 52 of the shaft 45.

The clutch housing 50 contains interleaved friction clutch discs 71 and 72 having spline connections at 73 and 74 respectively to the clutch housing and to the portion of the shaft 45 which extends into the clutch housing. A head element 50H of the clutch housing 50 has threaded into it at 76 a clutch loading screw 77 having a hand wheel or the like 78 for turning it. The screw 77 is hollow at 79 so that the end of the shaft 45 is received in it, and it is adapted to engage and apply force to a clutch loading plate 80. Adjustments of the screw 77 may cause the shaft 45 to be held against rotation or may free it for rotation. Moreover, appropriate adjustment may cause the shaft normally to be nonrotatable, but to turn upon the exertion of a sufficient force thereon.

Rotation of the shaft 45 may be effected by rotation of the gear 43 when the adjustment of the clutch above described permits. This rotation may be manually effected, but preferably is motor effected, and while, with a motor provided for the purpose, either motor control or control of the driving connection of the motor with the shaft is possible, I illustrate the latter in Fig. 3. Here it will be seen that there is provided upon a bracket 81 carried by the pedestal 27 a motor 82 driving a splined drive shaft 83 slidably supporting a driving pinion 84 adjustable by any suitable means—as by the handle 85 having a yoke 86 engaging in a groove 87 in the hub of the pinion 84—between positions of driving and non-driving relation to the gear 43. Of course the motor 82 will be provided with any suitable control so that it need not be driven continuously, and it may be connected directly with the drive shaft or through a suitable speed reducer in a housing 82A.

The conveyor trough 1 is so flexible that it may readily be flattened for winding on the drum or reel 60 and has its end remote from the discharge apparatus 3 secured in any suitable manner to the drum or reel, and the portion not required at any time to extend between the material-receiving apparatus 2 and the material-discharging apparatus 3 will be wound upon the drum and so stored there. While more will be said later on this point, it will be evident that if the end of the trough element 1 remote from the reel or drum is held, any desired tension may be imposed upon it by proper rotation of the shaft 45, storing energy in the spring 62, and the tension may be fixed by tightening the friction clutch by rotation of the screw 77.

Turning now to the material-discharging apparatus 3, it may be noted that this comprises a base plate 101 having a wider end 102 and a narrower end 103. The wider end is the discharge end and it supports and has fixed to it upstanding side plates 104, 104. To and between these there is fixed a stationary discharge trough element 105 overlying the conveyor 6 and adapted to deliver material to the latter. The element 105 has upright side flanges 106, 106 and a connecting bottom portion 107.

To maintain the position of the base plate 101 it may be pivotally connected as at 108 to a mine floor engaging plate 109 securely held in position as by means of jacks J, J. The pivotal connection permits some lateral movement of the material-receiving end of the system.

The discharge end of the flexible conveyor trough 1 extends into and is connected to the forward end of a supporting trough element 110. This is of substantial length and includes a flat bottom 111 and upright sides 112, 112 and the element 1, which is flattened out as it passes over the bottom 111 (by which it is supported) may desirably, though other arrangements are obviously possible, be held to the bottom 111 by bending it over and then under a transverse strip 114 having upstanding ends 115, 115 and securing such strip in fixed position relative to the trough element 110 by means of a generally U-shaped holding member 116 having a horizontal portion 117 underlying the end of the trough element 110 and the underturned end of the conveyor 1 and the overlying transverse strip 114 and having upstanding ends 118, 118 bent down at their tops as at 120 over the upright sides 112, 112 and the upstanding ends 115, 115, which are of like height to the sides 112, 112 and so preventing the strip 114 from lifting and letting the element 1 escape.

As will hereinafter appear, the spring 62 and the drum 60 are adapted to provide movements of the conveyor trough 1 away from the conveyor 6 of such a character as to cause the trough to move beneath the material which rests upon it. To move the conveyor trough 1 towards the conveyor 6, i. e. to effect material moving movements thereof, and to free it for the movements imparted to it by the spring 62, the following arrangements are illustrated:

The supporting trough element 110 has fixed to its bottom a transverse member, herein an angle iron 121, to which there is attached the piston rod 122 of a piston 123 of an expansible chamber motor 124 in the cylinder 125 of which the piston 123 is reciprocable. The motor 124 is herein a hydraulic motor and it has a pilot controlled valve mechanism generally designated 126. The valve mechanism includes, as shown, a pilot valve element 128 and a main valve 129. The pilot valve is mechanically actuated by arms 131 secured to one of the upright sides 112 and adapted to engage push rods 132 of equal diameters secured to the opposite ends of the pilot valve element 128. The arms 131 may of course be adjustably mounted if desired. The pilot valve element 128 is reciprocable in a bore 134 in a valve chest 135 to which fluid is supplied at its longitudinal center by a supply conduit 136 leading to a supply port 137. The bore 134 is connected by three passages 141, 142, and 143 with a bore 144 in what is herein illustrated as another valve chest 145, but which might obviously be integral with the valve chest 135. Passage 142 is shown in the same transverse plane with the passage 137; passages 141 and 143 are so related to the ends of the bore 134 that their communication with it cannot be interrupted by the pilot valve 128 but also so that the latter cannot connect either of them with the supply passage 137. The pilot valve 128 has spaced heads 128A and 128B between which there is an annular space or groove 128G, and at each side of the supply passage 137 there opens into the bore 134 a throwing passage. These throwing passages are numbered 151 and 152. They are so spaced that they cannot be connected by the groove 128G, but each is connected in one or the other extreme position of the pilot valve 128 with the supply passage 137.

The main valve 129 is reciprocable in the bore 144 whose opposite ends are connected by conduits 155 and 156 respectively with the throwing passages 151 and 152, so that admission of fluid alternately to the latter will cause the main valve 129 to be reciprocated in the bore 144.

In the same sets of transverse planes with the passages 141 and 143 there are ports 161 and 163 communicating with a longitudinal passage 164 which connects with a vent passage 165.

The main valve 129 has four annular larger portions fitting the bore 144 and three intermediate annular spaces or grooves. The annular portions are numbered 171, 172, 173, 174 and grooves 175, 176 and 177 respectively separate annular portions 171 and 172, 172 and 173, and 173 and 174. Grooves 175 and 177 always serve to connect through associated passages the opposite ends of the bore 134 with exhaust, and they alternately connect ports 180 and 181 with exhaust through the ports 161 and 163. The ports 180 and 181 open into the bore 144 at opposite sides of the passage 142 and may be connected alternately with that passage by the groove 176. The port 180 is connected by a conduit 183 to the cylinder 125 at its end through which the piston rod 122 does not extend. The port 181 is connected with a conduit 184 which leads to a reservoir T for hydraulic fluid. A suitably driven pump P draws fluid from the reservoir T via a conduit 186 and delivers it to the conduit 136. The conduit 136 may be connected back with the tank T under the control of a suitable preset relief valve if desired or suitable pressure control may be incorporated in the pump in a well-known manner.

It will be observed that with the valves 128 and 129 in the positions shown in Figs. 6 and 10 fluid will be supplied at appropriate pressure from the conduit 136 through the groove 128G, the passage 142, the groove 176, the port 180 and the conduit 183 to the cylinder 125 and move the piston 123 to the left in Figs. 1A and 10, and so the conveyor 1 will be moved at a relatively constant rate in a discharge direction, and this will, as will be evident, store energy in the spring 62 as the conveyor element 1 has a portion of it unwound (pulled off) of the drum 60. When right-hand arm 131 in Fig. 1A engages the right-hand stem 132 on the pilot valve 128 and moves it to its opposite position, the main valve will be thrown to its opposite position by fluid supplied through the throwing passage 155 and the passage 183 will be connected to exhaust, while the conduit 184 will effect return to the reservoir T of all the fluid which the pump P delivers to the conduit 136. Thus the trough element 110 may be freely pulled by the flexible trough element 1 as the reel or drum 60 is rotated by the energy stored in the spring 62.

The hydraulic motor 124 possesses sufficient power to move the loaded trough 1 and associated parts in a discharge direction and to rotate the drum 60 in a trough-paying out direction against the increasing resistance of the spring 62 as the latter is caused to be wound an additional amount by the rotation of the drum.

The mode of operation of the apparatus described will already be clear, but may be summarized as follows: Viewed from the right in Fig. 3, the conveyor strip 1 is wound clockwise on the drum 60. Accordingly, as it is drawn off of the drum, it will rotate the latter, provided its axis of rotation be stationary, clockwise. If the shaft 45 is held against rotation, rotation of the drum 60 will mean that the spring 62 has its end connected to the drum move clockwise relative to its stationary end that is fixed to the shaft 45, and this means winding the spring tighter, because the spring is so formed that rotation, in the direction mentioned, of its right-hand end relative to its left-hand end will result in tightening of the spring and storing energy in it. The strength of the spring will be sufficient to pull a loaded trough sharply back towards the miner, when traction by the motor 124 is discontinued and the hydraulic fluid is vented from the latter.

If the material-receiving apparatus 2 is to be moved, without the supply of material to it, the friction clutch within the housing 50 will not be loaded, and the drum 60, the spring 62 and the shaft 45 will turn in a direction to permit paying off of the flexible conveyor strip as the apparatus 2 moves away from the apparatus 3. When it is desired to commence the loading operation the apparatus provided for the purpose (herein the motor 82 and the drive for the gear 43) will be caused to rotate the shaft 45. As the shaft is connected through the spring 62 with the drum 60 the slack in the conveyor strip will be yieldingly taken up, and when the slack is taken up and the desired tension exists in the spring 62, the handwheel 78 may be turned to apply the friction clutch and so hold the shaft 45 against turning backward under the tension exerted by the spring. The setting of the friction clutch will desirably be such that as the miner advances and thus increases the tension in the strip 1, the clutch may slip enough to permit the necessary paying out of strip to compensate for the bodily advance with the miner of the apparatus 2.

If it be desired to wind up the conveyor 1 and return the material-receiving apparatus to adjacency to the conveyor 6, the draw bar 32 may be disconnected, and by winding up the conveyor on the drum the apparatus 2 will be moved as mentioned.

When the conveyor is extended and the pump P is operating and the requisite tension exists in the spring 62, the conveyor will be operating. Conveying operation may be discontinued either by stopping the pump or by reducing the tension of the spring 62 to such an extent that it will not pull the conveyor strip again in a direction away from the conveyor 6. Thus, stopping may be effected at either end of the conveyor. If the requisite tension of the spring 62 exists but the pump P is not operating, starting can be effected at the discharge end by starting the pump. Starting may be effected at the material-receiving end of the conveyor, if the pump P is running and the spring 62 is not sufficiently tensioned to cause operation of the conveyor, merely by properly effecting tensioning of the spring. It will also be evident that when the pump P is running and the spring is so tensioned that the conveyor is operating, operation may be discontinued by backing up the Miner sufficiently to reduce the tension of the spring 62 below that required to maintain operation. In like manner, if the handwheel is so adjusted as to apply the friction clutch, but the portion of the strip lying between the drum 60 and the discharge end of the strip is so slack that there is no sufficient tension of the spring 62 to maintain a conveying operation, mere advance by the Miner of the apparatus located at the adjacent end of the conveyor can be utilized to build up such a tension in the spring as to initiate and cause the maintenance of conveying operation. Evidently, therefore, the apparatus is capable of control from either end in a very convenient manner: from the discharge end by control of the drive of the pump, and from the receiving end by control of the tension of the spring—by hand or power control of the shaft 51, or by movements of the Miner to which the forward end of the apparatus is connected. It will of course be appreciated that when the pilot valve element 128 is in its position opposite that shown in Fig. 10 and the main valve 129 is also in its position opposite that shown in Fig. 10, the motor 124 will stop unless and until the supporting trough element 110 is moved back sufficiently to cause the movement of the pilot valve 128 back to the position of Fig. 10, and the fluid discharged by the pump will simply be delivered back to the tank T.

Further details of the operation will be apparent from what has been said, so this description need not be extended, other than again to direct attention not only to the improved resilient control means for the drum, the improved hydraulic system described, and the improved attachment arrangement for the discharge end of the flexible conveyor.

While there is in this application specifically described one form which the invention may assume in practice, it will be understood that this form of the same is shown for purposes of illustration and that the invention may be modified and embodied in various other forms without departing from its spirit or the scope of the appended claims.

What I claim is:

1. In combination, in a flexible shaker conveyor which includes a material-receiving apparatus, a material-delivery apparatus, and a flexible conveyor element having a longitudinally reciprocable free length extending, under tension throughout its length during each of its opposite movements, between said apparatus for moving material from the first apparatus to the second, the improvement which consists in providing in said material-delivery apparatus a motor and mechanism actuated thereby for periodically exerting traction on said flexible conveyor element in a direction away from said material-receiving apparatus and in providing in said material-receiving apparatus a drum to which said flexible conveyor element is attached and on which a portion thereof is wound and means for supporting, and rotating in a direction to wind in flexible conveyor element, and yieldably resisting rotation of said drum in a direction to release flexible conveyor element towards said material-delivery apparatus including a shaft relative to which said drum is rotatable, means for selectively rotating said shaft and holding it stationary, and a spring connected between said shaft and drum for alteration of the tension thereof upon relative rotation between said shaft and drum and for increase in the tension thereof on rotation of the drum relative to the shaft releasing flexible conveyor element as aforesaid.

2. In combination, in an apparatus for exerting periodic tractions on a flexible shaker conveyor trough, a support, a supporting trough reciprocable relative to said support and having a connection with a flexible shaker conveyor trough, a hydraulic motor including relatively reciprocable cylinder and piston elements one connected to said supporting trough and the other to said support, a fluid reservoir, a pump having a suction connection with said reservoir and a discharge, and distributing valve means for alternately connecting said pump discharge with said motor and with said fluid reservoir and for connecting said motor with said reservoir while the pump discharge is connected with the latter.

3. In combination, in an apparatus for exerting periodic tractions on a flexible shaker conveyor trough, a support, a supporting trough reciprocable relative to said support and having a connection with a flexible shaker conveyor trough, a hydraulic motor including relatively reciprocable cylinder and piston elements one connected to said supporting trough and the other to said support, a fluid reservoir, a pump having a suction connection with said reservoir and a discharge, and distributing valve means for alternately connecting said pump discharge with said motor and with said fluid reservoir and for connecting said motor with said reservoir while the pump discharge is connected with the latter, said distributing valve means actuated by said supporting trough as the latter approaches its opposite limits of movement.

4. In combination, in an apparatus for exerting periodic tractions on a flexible shaker conveyor trough, a support, a supporting trough reciprocable relative to said support and having a connection with a flexible shaker conveyor trough, a hydraulic motor including relatively reciprocable cylinder and piston elements one connected to said supporting trough and the other to said support, a fluid reservoir, a pump having a suction connection with said reservoir and a distributing valve means for alternately connecting said pump discharge with said motor and with said fluid reservoir and for connecting said motor with said reservoir while the pump discharge is connected with the latter, said distributing valve means including a main valve and a pilot valve actuated by said supporting trough as the latter approaches its opposite limits of movement.

5. In combination, in a shaker conveyor apparatus, a supporting trough guided for reciprocation and including a bottom and upstanding sides, a flexible conveyor strip overlying the bottom of said supporting trough, and means for connecting said strip to said trough including a bar having a base of a width comparable to the width of the bottom of said trough and side arms of a height the same as said upstanding sides, said strip passed over said bottom and over said base and rebent under said base, and a holding element having a base underlying said rebent end of said conveyor strip and the adjacent portion of the bottom of said supporting trough, and upstanding arms having the upper ends thereof bent down over the tops of said upstanding sides and said side arms.

6. In combination, in a shaker conveyor apparatus, a supporting trough guided for reciprocation and including a bottom and upstanding sides, a flexible conveyor strip overlying the bottom of said supporting trough, and means for connecting said strip to said trough including a bar having a base of a width comparable to the width of the bottom of said trough and side arms of a height the same as said upstanding sides, said strip passed over said bottom and over said base and rebent under said base, and a holding element having a base underlying said rebent end of said conveyor strip and the adjacent portion of the bottom of said supporting trough, and upstanding arms having at the upper ends thereof means cooperating with said side arms to prevent the lifting of said base relative to the bottom of said trough.

7. In an apparatus for providing a yielding tension upon a flexible shaken conveyor trough, in combination, a base, a shaft rotatably mounted on said base, a drum rotatably supported on said shaft, a helical spring inside said drum and surrounding said shaft and having one end fixed to said drum and its other end fixed to said shaft, means coacting with one end of said shaft to rotate the same at will, and means coacting with the other end of said shaft to hold the same against rotation or to release it for free turning.

8. In an apparatus for providing a yielding tension upon a flexible shaken conveyor trough, in combination, a base, a shaft rotatably mounted on said base, a drum rotatably supported on said shaft, a helical spring inside said drum and surrounding said shaft and having one end fixed to said drum and its other end fixed to said shaft, means coacting with one end of said shaft to rotate the same at will, and means coacting with the other end of said shaft to hold the same against rotation until a predetermined torque is attained or to release it for free turning.

9. In an apparatus for providing a yielding tension upon a flexible shaker conveyor trough, in combination, a base, a shaft rotatably mounted on said base, a drum rotatably supported on said shaft, a helical spring inside said drum and surrounding said shaft and having one end fixed to said drum and its other end fixed to said shaft, means coacting with one end of said shaft to rotate the same at will, and means coacting with the other end of said shaft to hold the same against rotation until a predetermined torque is attained or to release it for free turning, including friction discs held respectively against rotation with respect to said base and with respect to said shaft and loading means for said discs.

10. In combination, in a flexible shaker conveyor, a flexible conveyor element, and means for effecting series of opposite movements of a material-carrying portion thereof including at the material-delivery end thereof a motor for periodically pulling the same and at the other end thereof a drum on which a portion of said flexible element is wound and resilient means imposing on said drum a yielding resistance to rotation in an unwinding direction and a rotative force in the opposite direction.

11. In combination, in a flexible shaker conveyor, a flexible conveyor element, and means for effecting series of opposite movements of a material-carrying portion thereof including at the material-delivery end thereof a motor and mechanism actuated by said motor periodically pulling the same and at the other end thereof a drum on which a portion of said flexible element is wound and means imposing on said drum a yielding resistance to rotation in an unwinding direction and a resilient torque in a winding direction including a shaft rotatable relative to said drum, a spring connected at its opposite ends to said drum and to said shaft respectively, and means for rotating or holding said shaft at will.

12. In combination, in a flexible shaker conveyor, a flexible conveyor element, and means for effecting series of opposite movements of a material-carrying portion thereof including at the material-delivery end thereof a motor and mechanism actuated by said motor periodically pulling the same and at the other end thereof a drum on which a portion of said flexible element is wound and means imposing on said drum a yielding resistance to rotation in an unwinding direction and a resilient torque in a winding direction including a shaft rotatable relative to said drum, a spring connected at its opposite ends to said drum and to said shaft respectively, means for rotating said shaft at will and means for frictionally holding said shaft against rotation.

13. In combination, in a flexible shaker conveyor, a flexible conveyor element and means for effecting a series of opposite movements of a material-conveying portion thereof including at the material-delivery end thereof a motor for periodically pulling the same in a discharge direction and at the other end thereof a spring for periodically pulling said flexible element in the opposite direction, means at said material-delivery end for controlling said motor, and means at the material-receiving end for controlling the tension of said spring including means for effecting the storing of energy in said spring, while the latter remains stationary as regards translatory movement as a whole.

14. In combination, in a flexible shaker conveyor, a flexible conveyor element and means for effecting a series of opposite movements of a material-conveying portion thereof including at the material-delivery end thereof a motor for periodically pulling the same in a discharge direction and at the other end thereof a spring for periodically pulling said flexible element in the opposite direction, means at said material-delivery end for controlling said motor, and means at the material-receiving end for releasing the tension of said spring while the latter is stationary as regards translatory movement as a whole.

15. In combination, in a flexible shaker conveyor, a flexible conveyor element and means for effecting a series of opposite movements of a material-conveying portion thereof including at the material-delivery end thereof a motor for periodically pulling the same in a discharge direction and at the other end thereof a spring for periodically pulling said flexible element in the opposite direction, said spring and said motor each having a mounting individual to it, and means at each end of said material-conveying portion for controlling the reciprocation thereof while the distance between said motor and spring mountings is fixed.

16. In combination, in a flexible shaker conveyor, a flexible conveyor element and means for effecting a series of opposite movements of a material-conveying portion thereof including at the material-delivery end thereof a fluid pump and a motor driven by fluid from said pump for periodically pulling the said portion in a discharge direction and at the other end of said portion a spring for periodically pulling said flexible element in the opposite direction, means at said material-delivery end for controlling said pump and means at the material-receiving end for controlling the tension of said spring.

17. In combination, in a flexible shaker conveyor, a flexible conveyor element and means effecting a series of opposite movements of a material-conveying portion thereof including at the material-delivery end thereof a motor for periodically pulling the same in a discharge direction and at the other end thereof a spring for periodically pulling said flexible element in the opposite direction, means at said material-delivery end for controlling said motor and means at the material-receiving end for controlling the tension of said spring including means for releasably fixing one end of said spring releasable to remove the tension therefrom.

References Cited in the file of this patent

UNITED STATES PATENTS

| | | |
|---|---|---|
| 2,005,589 | McCoy | June 18, 1935 |
| 2,049,346 | Bebinger | July 28, 1936 |
| 2,299,005 | Bigelow | Oct. 13, 1942 |
| 2,337,174 | Bebinger | Dec. 21, 1943 |
| 2,449,473 | Hagenbook | Sept. 14, 1948 |

FOREIGN PATENTS

| | | |
|---|---|---|
| 101,538 | Great Britain | Jan. 18, 1923 |
| 492,525 | Great Britain | Sept. 19, 1938 |
| 530,720 | Great Britain | Dec. 18, 1940 |
| 622,674 | Great Britain | May 5, 1949 |